United States Patent
Ose et al.

(10) Patent No.: US 10,479,359 B2
(45) Date of Patent: Nov. 19, 2019

(54) RESTART CONTROL DEVICE FOR INTERNAL COMBUSTION ENGINE

(71) Applicant: DENSO CORPORATION, Kariya, Aichi-pref. (JP)

(72) Inventors: Tomohisa Ose, Kariya (JP); Tadatoshi Asada, Kariya (JP); Shigeru Maeda, Kariya (JP); Takashi Senda, Kariya (JP)

(73) Assignee: DENSO CORPORATION, Kariya (JP)

( * ) Notice: Subject to any disclaimer, the term of this patent is extended or adjusted under 35 U.S.C. 154(b) by 119 days.

(21) Appl. No.: 15/558,379

(22) PCT Filed: Apr. 28, 2016

(86) PCT No.: PCT/JP2016/002231
§ 371 (c)(1),
(2) Date: Sep. 14, 2017

(87) PCT Pub. No.: WO2016/181634
PCT Pub. Date: Nov. 17, 2016

(65) Prior Publication Data
US 2018/0080425 A1 Mar. 22, 2018

(30) Foreign Application Priority Data
May 12, 2015 (JP) ................. 2015-097589

(51) Int. Cl.
*B60W 30/18* (2012.01)
*B60K 6/485* (2007.10)
(Continued)

(52) U.S. Cl.
CPC ....... *B60W 30/18072* (2013.01); *B60K 6/485* (2013.01); *B60K 6/54* (2013.01);
(Continued)

(58) Field of Classification Search
CPC ... B60W 30/18072; B60W 2030/1809; B60W 2520/10; B60W 2710/021; B60W 2710/06; F02N 11/0818
See application file for complete search history.

(56) References Cited

U.S. PATENT DOCUMENTS 6,524,217 B1    2/2003   Murakami et al.
8,246,517 B2 *  8/2012   Senda ............... B60W 10/06
                                                   477/121

(Continued)

FOREIGN PATENT DOCUMENTS

JP    S60-49237 U    4/1985
JP    2000-220557 A  8/2000
(Continued)

OTHER PUBLICATIONS

Jul. 26, 2016 Search Report issued in International Patent Application No. PCT/JP2016/002231.

*Primary Examiner* — David R Morris
(74) *Attorney, Agent, or Firm* — Oliff PLC

(57) ABSTRACT

A restart control device is applied to a vehicle which is provided with an internal combustion engine, an electric motor, a driving wheel, and a clutch. The restart control device has a restart-condition determining portion which determines whether a restart condition for restarting the internal combustion engine is established while the vehicle is coasting; a push-start portion which starts the internal combustion engine by a push-start; a start-up portion which starts the internal combustion engine by use of an electric motor; and a doubly start-up portion which tries to start the internal combustion engine by one of the push-start portion and the start-up portion when the restart-condition determining portion determines that the restart condition is established. The doubly start-up portion tries to start the internal (Continued)

combustion engine by another one of the push-up portion and the start-up portion when the internal combustion engine has not been started.

5 Claims, 3 Drawing Sheets

(51) Int. Cl.
    *B60K 6/54*         (2007.10)
    *F02N 11/08*       (2006.01)
    *B60W 10/02*      (2006.01)
    *B60W 10/06*      (2006.01)
    *B60W 10/08*      (2006.01)
    *B60W 10/10*      (2012.01)
    *F02D 29/02*       (2006.01)
    *B60W 10/11*      (2012.01)
    *F02N 5/04*        (2006.01)
    *B60W 20/40*      (2016.01)

(52) U.S. Cl.
    CPC ............ *B60W 10/02* (2013.01); *B60W 10/06* (2013.01); *B60W 10/08* (2013.01); *B60W 10/10* (2013.01); *B60W 10/11* (2013.01); *B60W 20/40* (2013.01); *F02D 29/02* (2013.01); *F02N 5/04* (2013.01); *F02N 11/08* (2013.01); *F02N 11/0818* (2013.01); *B60W 2030/1809* (2013.01); *B60W 2030/18081* (2013.01); *B60W 2510/1005* (2013.01); *B60W 2520/10* (2013.01); *B60W 2710/021* (2013.01); *B60W 2710/06* (2013.01); *B60W 2710/1005* (2013.01); *F02N 11/0825* (2013.01); *F02N 2200/0801* (2013.01); *F02N 2200/0802* (2013.01); *F02N 2300/2002* (2013.01)

(56) References Cited

U.S. PATENT DOCUMENTS

| | | | | |
|---|---|---|---|---|
| 8,622,872 B2* | 1/2014 | Pedlar | ................... | B60W 10/02 477/181 |
| 9,150,210 B2* | 10/2015 | Pedlar | ................... | B60W 10/02 |
| 9,410,584 B2* | 8/2016 | Maeda | ............ | B60W 30/18072 |
| 9,422,881 B2* | 8/2016 | Maeda | ................... | F02D 41/022 |
| 9,878,713 B2* | 1/2018 | Petridis | ................. | B60W 10/02 |
| 9,920,731 B2* | 3/2018 | Lee | ....... | F02N 11/0803 |
| 2010/0184562 A1* | 7/2010 | Senda | ................... | B60W 10/06 477/99 |
| 2011/0136620 A1* | 6/2011 | Gibson | ................. | B60W 10/02 477/64 |
| 2011/0136622 A1* | 6/2011 | Enoki | ................... | B60W 10/02 477/83 |
| 2012/0100960 A1* | 4/2012 | Pedlar | ................... | B60W 10/02 477/171 |
| 2012/0142494 A1* | 6/2012 | Yamada | .............. | B60W 10/026 477/175 |
| 2012/0172175 A1* | 7/2012 | Nedorezov | ........... | F02D 41/065 477/169 |
| 2012/0265427 A1* | 10/2012 | Petridis | ................. | B60W 10/02 701/113 |
| 2014/0094344 A1* | 4/2014 | Pedlar | ................... | B60W 10/02 477/174 |
| 2016/0017825 A1* | 1/2016 | Maeda | ................. | F02D 41/022 701/58 |
| 2016/0017939 A1* | 1/2016 | Maeda | ............ | B60W 30/18072 701/58 |
| 2016/0327005 A1* | 11/2016 | Lee | ....... | F02N 11/0803 |

FOREIGN PATENT DOCUMENTS

| | | |
|---|---|---|
| JP | 2001-107763 A | 4/2001 |
| JP | 2007-196763 | 8/2007 |
| JP | 2010-241330 A | 10/2010 |
| JP | 2012-166575 A | 9/2012 |
| JP | 2015-14231 A | 1/2015 |

\* cited by examiner

RESTART CONTROL DEVICE FOR INTERNAL COMBUSTION ENGINE

CROSS REFERENCE TO RELATED APPLICATION

This application is based on Japanese Patent Application No. 2015-97589 filed on May 12, 2015, the disclosure of which is incorporated herein by reference.

TECHNICAL FIELD

The present disclosure relates to a control device which controls a restart of an internal combustion engine.

BACKGROUND ART

In recent years, an idle reduction coasting technology is required in order to improve a fuel economy, in which an internal combustion engine (referred to as an engine) is stopped and a coasting is performed.

In Patent Literature 1, when a restart requirement for an engine is generated while a vehicle is coasting, and a rotational variation of an output shaft connected to a driving wheel is higher than a set value, a clutch is connected to an output shaft of the engine so that an rotation speed of the engine is increased by a driving force which a running vehicle has, whereby the engine is restarted (referred to as a push-start). Moreover, when the rotational variation of the output shaft is lower than the set value, the engine is started by a starter motor.

In a vehicle provided with such an idle reduction coasting technology, since the engine may be stopped while a vehicle is running at high speed, it is required to surely perform a restart of the engine. However, the restart of the engine by the push-start described in Patent Literature 1 is not always ensured. Similarly, the restart of the engine by the starter motor is not always ensured.

PRIOR ART LITERATURES

Patent Literature

[Patent Literature 1] JP 2015-14231 A

SUMMARY OF INVENTION

It is an object of the present disclosure to provide a restart control device which is able to surely perform a restart of an engine while a vehicle is coasting.

According to the present disclosure, a restart control device is applied to a vehicle which is provided with an internal combustion engine, an electric motor which is connected to an output shaft of the internal combustion engine so that a torque is applied to the output shaft to increase a rotation speed of the internal combustion engine, a driving wheel, and a clutch device which is engaged or disengaged to permit or prohibit a power transmission between the output shaft of the internal combustion engine and the driving wheel.

The restart control device includes a performing-condition determining portion which determines whether a performing condition is established for the vehicle to perform a coasting; a coasting portion which terminates a fuel supply to the internal combustion engine and disengages the clutch device to perform a coasting of the vehicle when the performing-condition determining portion determines that the performing condition is established; a restart-condition determining portion which determines whether a restart condition for restarting the internal combustion engine is established while the vehicle is coasting; a push-start portion which engages the clutch device to increase a rotation speed of the internal combustion engine by a driving force generated by the coasting, and reopens the fuel supply to the internal combustion engine to start the internal combustion engine; a start-up portion which increases the rotation speed of the internal combustion engine by means of the electric motor, and reopens the fuel supply to the internal combustion engine to start the internal combustion engine; and a doubly start-up portion which tries to start the internal combustion engine by one of the push-start portion and the start-up portion when the restart-condition determining portion determines that the restart condition is established, and which tries to start the internal combustion engine by another one of the push-up portion and the start-up portion when the internal combustion engine has not been started.

According to the above configuration, the restart control device is applied to a vehicle which is provided with an internal combustion engine, a driving wheel, a clutch device which is engaged or disengaged to permit or prohibit a power transmission between the output shaft of the internal combustion engine and the driving wheel, and an electric motor which is connected to an output shaft of the internal combustion engine so that a torque is applied to the output shaft to increase a rotation speed of the internal combustion engine. The restart control device is provided with a performing-condition determining portion which determines whether a performing condition is established for the vehicle to perform a coasting. When it is determined that the performing condition is established, a coasting portion terminates a fuel supply to the internal combustion engine and disengages the clutch device to perform a coasting of the vehicle. A restart-condition determining portion determines whether a restart condition for restarting the internal combustion engine is established while the vehicle is coasting.

In the present restart control device, the restart of the engine is conducted according to two configurations while the vehicle is coasting. According to one configuration, a push-start portion engages the clutch device to increase a rotation speed of the internal combustion engine by a driving force generated by the coasting, and then reopens the fuel supply to the internal combustion engine to start the internal combustion engine. According to the other configuration, a start-up portion increases the rotation speed of the internal combustion engine by means of the electric motor, and then reopens the fuel supply to the internal combustion engine to start the internal combustion engine. When the restart-condition determining portion determines that the restart condition is established, a doubly start-up portion tries to start the internal combustion engine by one of the push-start portion and the start-up portion. When the internal combustion engine has not been started, the doubly start-up portion tries to start the internal combustion engine by another one of the push-up portion and the start-up portion. As above, the restart of the internal combustion engine is doubly tried, so that the restart of the internal combustion engine can be surely conducted.

BRIEF DESCRIPTION OF DRAWINGS

The above and other objects, features and advantages of the present disclosure will become more apparent from the following detailed description made with reference to the accompanying drawings.

EMBODIMENTS FOR CARRYING OUT INVENTION

A restart control device for internal combustion engine according to the present disclosure will be described referring to drawings, hereinafter.

Figure 1:
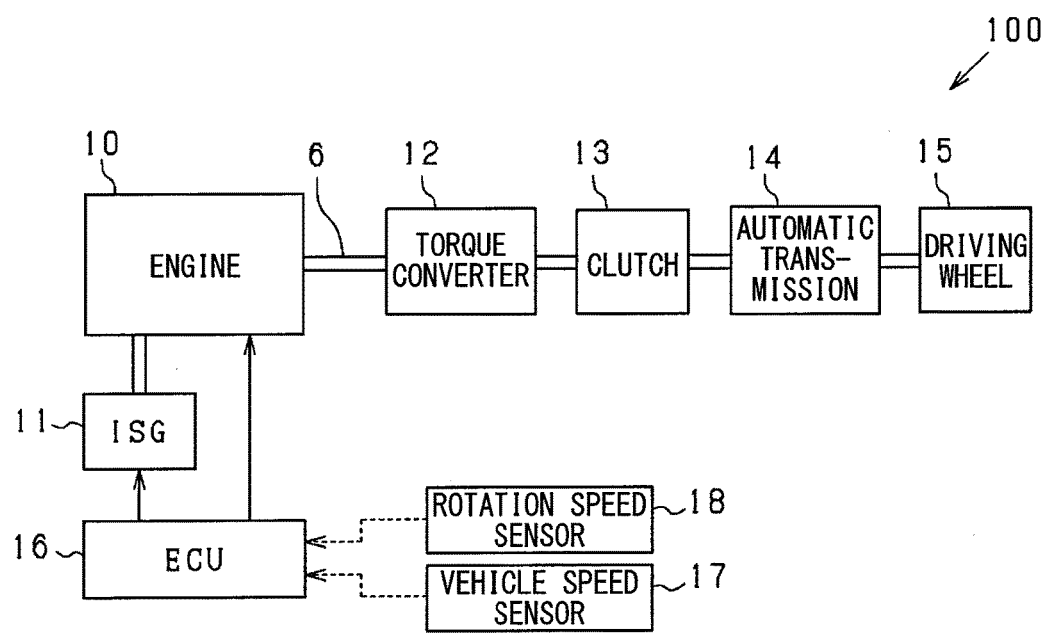
FIG. 1 is a chart showing an entire configuration of a vehicle according to a present embodiment.

FIG. 1 shows a configuration of a vehicle 100 having an internal combustion engine, which will be referred to as an engine. An ISG (Integrated Starter Generator) 11 is connected to an output shaft (crankshaft) 6 of the engine 10. The ISG 11 is driven by the crankshaft 6 and has an engine starting function and an output assistance function in addition to a power generation function. As the engine starting function, the ISG 11 supplies a torque to the crankshaft 6 to start the engine 10 in which no fuel combustion is conducted after the engine 10 is warmed up. For example, when the engine 10 is restarted after an idle reduction, the engine starting function is performed. Moreover, as the output assistance function, the ISG 11 supplies a torque to the crankshaft 6 while the vehicle is running after the engine 10 is started, so that the crankshaft 6 is driven with an assistance of the ISG 11. Thus, the ISG 11 corresponds to an electric motor.

Moreover, the crankshaft 6 is sequentially connected to a fluid-friction joint (torque converter) 12, a clutch (clutch device) 13, an automatic transmission (automatic transmission device) 14 and a driving wheel 15. The crankshaft 6 can be connected to the driving wheel 15 through the torque converters 12, the clutch 13, and the automatic transmission 14.

The automatic transmission 14 has a multistage shifting system provided with a planetary gear mechanism, a CVT, and the like. The clutch 13 is a forward clutch. The automatic transmission 14 has a parking (P) range, a reverse (R) range, a neutral (N) range, a drive (D) range (first range, second range). When the clutch 13 is engaged, the torque of the engine 10 is transmitted to the driving wheel 15 through the crankshaft 6.

An electronic control unit (ECU) 16 has a microcomputer and controls outputs of the engine 10 and the ISG 11 based on various information. The various information includes a vehicle speed detected by a vehicle speed sensor (vehicle speed detecting portion) 17 and a rotation speed of the engine 10 detected by a rotation speed sensor 18.

In the present embodiment, the ECU 16 corresponds to a performing-condition determining portion, a coasting portion, a restart-condition determining portion, a push-start portion, a start-up portion, a doubly start-up portion, a compulsorily start-up portion, and a gear ratio control portion.

It is assumed that the vehicle 100 having the above configuration is brought into a coasting condition (idle reduction coasting) in which the engine 10 is stopped while the vehicle is running at high speed. In this case, it is necessary to surely restart the engine 10. When the conventional technology is conducted (for example, restart by a starter), it is likely that the restart of the engine 10 may fail.

Figure 2:
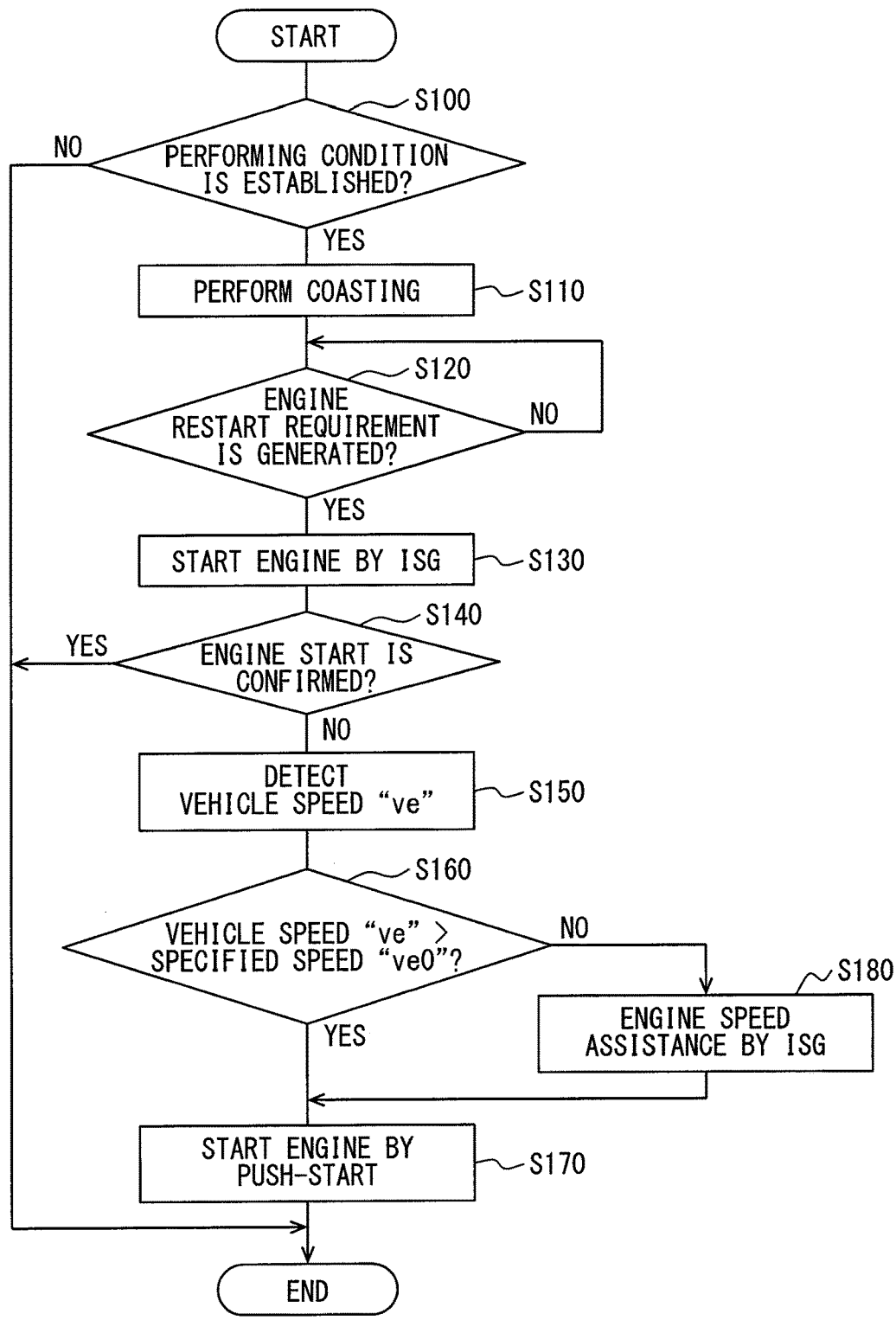
FIG. 2 is a flowchart which an ECU executes according to the present embodiment.

According to the present embodiment, the ECU 16 executes a restart control of the engine 10, which is shown in FIG. 2. When it is required to restart the engine 10, the restart of the engine 10 can be doubly tried in two ways. In one way (push-start), the engine 10 is restarted by a torque corresponding to a kinetic energy which the vehicle has. In the other way, the engine 10 is restarted by a torque which the ISG 11 outputs.

Referring to FIG. 2, the restart control of the engine 10, which the ECU 16 executes, will be described hereinafter. The restart control of the engine 10 shown in FIG. 2 is repeatedly executed by the ECU 16 at a specified cycle while the ECU 16 is ON.

In step 100, it is determined whether a performing condition for performing the idle reduction coasting is established. The performing condition includes an environmental condition, a vehicle condition, a power source condition, an engine condition, and a driver operation condition. Specifically, the environmental condition is established when an ambient temperature is within a specified range and an atmospheric pressure is within a specified range. The vehicle condition is established when a vehicle speed "ve" is within a specified range (for example, 40-120 km/h), a road surface gradient (slope) is within a specified range, a driving amount of electric components is not more than a specified amount, a brake negative pressure is larger than a specified negative pressure, and no prohibit requirement is generated from another ECU. The power source condition is established when a battery capacity is within a specified range, no electric power is generated (except a case where an electric power generation is required while the vehicle is coasting) and no prohibit requirement is generated from a power source system. The engine condition is established when an engine coolant temperature is within a specified range and a transmission oil temperature is within a specified range. The driver operation condition is established when an accelerator is OFF, a brake is OFF and a shift lever position is D-range.

When it is not determined that the above performing condition is established (S100: NO), the performing of the idle reduction coasting is not permitted to terminated the control. When it is determined that the above performing condition is established (S100: YES), the procedure proceeds to step 110 in which the idle reduction coasting of the vehicle is performed. It should be noted that the idle reduction coasting represents a vehicle condition in which a fuel supply to the engine 10 is stopped and the clutch 13 is disengaged so that the vehicle is coasting.

In step 120, it is determined whether a restart requirement for the engine 10 is generated. In the present embodiment, when a stepped amount Acc of the accelerator pedal is greater than a specified amount Acc0, it is determined that the restart requirement is generated. When it is not determined that the restart requirement for the engine 10 is generated (S120: NO), the determination in step 120 is repeated until the restart requirement for the engine 10 is generated. When it is determined that the restart requirement for the engine 10 is generated (S120: YES), the procedure proceeds to step 130.

In step 130, the ISG 11 is driven to generate a torque which drives the engine 10, and then the fuel combustion is performed to restart the engine 10. At this moment, the clutch 13 is disengaged and the coasting of the vehicle is maintained.

In step 140, it is determined whether the start of the engine 10 has succeeded. In the present embodiment, when the rotation speed of the engine 10, which is detected by the rotation speed sensor 18, exceeds a threshold α, it is determined that the start of the engine 10 has succeeded. The threshold α is established as a minimum value to which the engine speed is increased when the start of the engine 10 has succeeded. When it is determined that the start of the engine 10 has succeeded (S140: YES), the clutch 13 is engaged to terminate the control. When it is not determined that the start of the engine 10 has succeeded (S140: NO), the procedure proceeds to step 150.

In step 150, the vehicle speed sensor 17 detects the vehicle speed "ve". In step 160, it is determined whether the vehicle speed "ve" detected by the vehicle speed sensor 17 is greater than a specified speed "ve0" (for example, 20 km/h). The specified speed "ve0" is established as a vehicle speed at which the engine 10 can be restarted by a push-start. When it is determined that the vehicle speed "ve" is greater than the specified speed "ve0" (S160: YES), the procedure proceeds to step 170.

In step 170, the clutch 13 is engaged and the engine 10 is restarted by the push-start. Specifically, when the clutch 13 is engaged, the rotation of the driving wheel 15, which has been generated by the coasting of the vehicle, is transmitted to the crankshaft 16 through the automatic transmission 14, the clutch 13, and the torque converter 12, whereby the engine 10 is rotated. While the engine 10 is rotated, fuel combustion is conducted to start the engine 10. Then, the control is terminated.

When it is not determined that the vehicle speed "ve" is greater than the specified speed "ve0" (S160: NO), the procedure proceeds to step 180. In step 180, it is determined that the rotation speed of the engine 10 cannot be sufficiently increased only by the rotation transmitted from the driving wheel 15 since the vehicle speed "ve" is low. In addition to the rotation transmitted from the driving wheel 15, the output of the ISG 11 is applied to the engine 11 so that the rotation speed of the engine 10 is sufficiently increased. The procedure proceeds to step 170 in which the restart of the engine 10 is conducted by the push-start. Then, the control is terminated.

With the above configuration, the ECU 16 according to the present embodiment has following advantages.

In order to restart the engine 10 while the vehicle is coasting, the restart of the engine 10 is conducted according to two configurations. According to one configuration, after the rotation speed of the engine 10 is increased by the ISG 11, the fuel supply to the engine 10 is reopened to start the engine 10. According to the other configuration, the clutch 13 is engaged to increase the rotation speed of the engine 10 by driving force of coasting. Then, the fuel supply to the engine 10 is reopened to start the engine 10 (push-start). When it is determined that a restart requirement for the engine 10 is generated, the restart of the engine 11 is tried by the ISG 11. When the restart of the engine 10 fails, the push-start is conducted to restart the engine 10. As above, the restart of the engine 10 is doubly tried, so that the restart of the engine 10 can be surely conducted.

According to the present embodiment, when the restart requirement for the engine 10 is generated, the restart of the engine 10 is first tried by the ISG 11. When the engine 10 is restarted by the ISG 11, the push-start of the engine 10 is unnecessary, so that no shock is generated due to deceleration. A driver can drive a vehicle without feeling uncomfortable.

When the vehicle speed "ve" detected by the vehicle speed sensor 17 is greater than the specified speed "ve0", the restart of the engine 10 is tried by the push-start without the drive assistance of the ISG 11. Thereby, the restart of the engine 10 can be tried only by the driving force generated by the coasting. When the vehicle speed "ve" detected by the vehicle speed sensor 17 is less than the specified speed "ve0", the restart of the engine 10 is tried by the push-start with the drive assistance of the ISG 11. In a case where the vehicle speed "ve" is less than the specified speed "ve0", when the restart of the engine 10 is tried only by the push-start with the driving force generated by the coasting, the rotation speed of the engine 10 may not be sufficiently increased, which may cause a failure of restart of the engine 10. Therefore, in a case where the vehicle speed "ve" is less than the specified speed "ve0", the restart of the engine 10 by the push-start can be surely conducted along with a drive assistance of the ISG 11. Moreover, since the driving of the engine 10 is assisted by the ISG 11, shocks generated by conducting the push-start can be moderated. Thus, a deterioration in drivability can be restricted.

The above described embodiment can be modified as follows.

In the above embodiment, the clutch 13 is disengaged to perform the idle reduction coasting. However, a lock-up clutch disposed in the torque converter 12 may be disengaged to perform the idle reduction coasting.

The specified speed "ve0" is established as a vehicle speed at which the engine 10 can be restarted by a push-start. However, the specified speed "ve0" is not limited to this. For example, the specified speed "ve0" may be established as a vehicle speed at which the engine speed can be increased to start the engine 10. Also, a transmission gear ratio of the automatic transmission 14 may be changed to vary the specified speed "ve0".

In the above embodiment, when a restart requirement for the engine 10 is generated, the restart of the engine 11 is tried by the ISG 11. When the restart of the engine 10 fails, the push-start is conducted to restart the engine 10. However, the restart of the engine 11 may be first tried by the push-start. When the restart of the engine 10 fails, the restart of the engine 10 may be tried by the ISG 11. When the engine 10 is restarted by the push-start, the operation of the ISG 11 is unnecessary. Therefore, an electric power consumption can be reduced, as compared with a case in which the restart of the engine 10 by the ISG 11 is first tried. Also, a fuel consumption can be reduced.

In step 130 of FIG. 2, when the restart of the engine 10 by the ISG 11 is failed, the procedure proceeds to next step. The restart of the engine 10 by the ISG 11 may be tried multiple times. Also, in step 170, the restart of the engine 10 by the push-start may be tried multiple times.

In the procedure shown in FIG. 2, step 150, step 160 and step 180 can be omitted. In this case, when the vehicle speed "ve" is low, the rotation speed of the engine 10 cannot be sufficiently increased by the push-start, which may cause a failure of the restart of the engine 10. Thus, the current transmission gear ratio of the automatic transmission 14 is changed in such a manner that the rotation speed of the engine 10 becomes higher than the specified rotation speed (rotation speed necessary to start the engine 10) according to the vehicle speed "ve", whereby the rotation speed of the engine 10 can be surely increased.

In a case where the rotation speed of the engine cannot be increased higher than the specified rotation speed even though the transmission gear ratio of the automatic transmission 14 is made higher, the rotation speed of the engine 10 is increased with assistance of the ISG 11. Thereby, as compared with the control shown in FIG. 2, the output of the ISG 11 can be suppressed, so that the power consumption is also suppressed.

Figure 3:
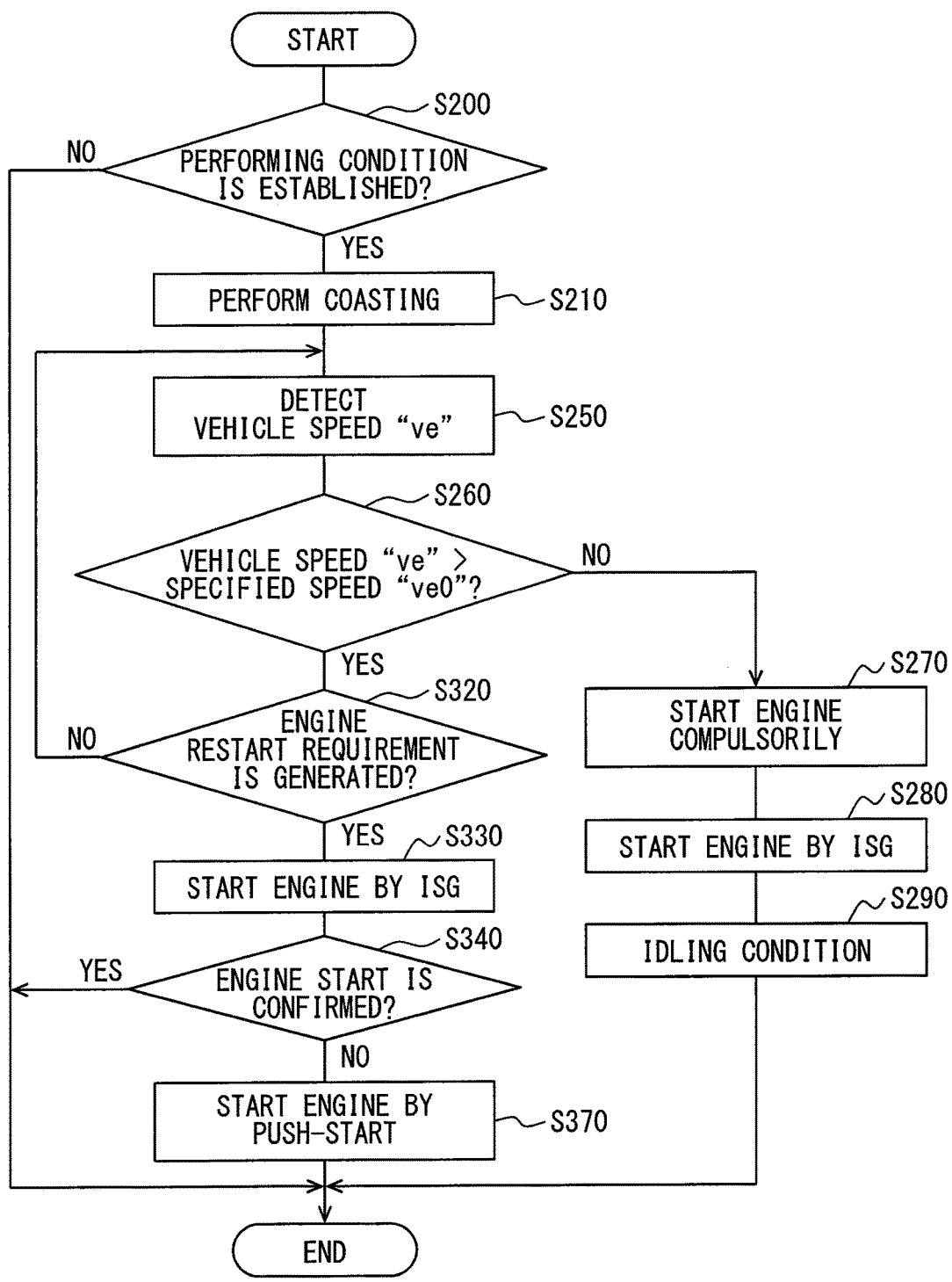
FIG. 3 is a flowchart which an ECU executes according to another embodiment.

FIG. 3 shows a procedure which is partially changed from the procedure shown in FIG. 2. That is, step 250 corresponding to step 150 and step 260 corresponding to step 160 are arranged between step 210 corresponding to step 110 and step 320 corresponding to step 320. When the answer is NO in step 260, the procedure proceeds to step 270-step 290 instead of step 180.

When it is not determined that the vehicle speed "ve" detected by the vehicle speed sensor 17 is greater than the specified speed "ve0" (S260: NO), the following control is performed.

When it is not determined that the vehicle speed "ve" is greater than the specified speed "ve0" (S260: NO), the procedure proceeds to step 270. In step 270, since the vehicle speed "ve" is not greater than the specified "ve0", it is determined that the restart of the engine 10 cannot be doubly tried. A compulsory start of the engine 10 is conducted.

In step 280, the ISG 11 is driven to generate a torque which drives the crankshaft 6, and then the fuel combustion is performed to restart the engine 10. In step 290, the clutch 13 is kept disengaged to continuously perform the coasting (idle coasting) while the engine 10 is running (idling). Then, the control is terminated.

The processes in steps 200, 210, 250, 260, 320, 330, 340, 370 of FIG. 3 are the same as those in steps 100, 110, 120, 130, 140, 150, 160, 170 of FIG. 2.

Thereby, even when the vehicle speed "ve" is less than the specified speed "ve0", the engine 10 is compulsorily started. The coasting of a vehicle can be maintained while the engine 10 is running.

This disclosure is described according to the embodiments. However, it is understood that this disclosure is not limited to the above embodiments or the structures. This disclosure includes various modified examples, and modifications falling within an equivalent range. In addition, while the various combinations and configurations, other combinations and configurations, including more, less or only a single element, are also within the spirit and scope of the present disclosure.

The invention claimed is:

1. A restart control device applied to a vehicle which is provided with an internal combustion engine, an electric motor which is connected to an output shaft of the internal combustion engine so that a torque is applied to the output shaft to increase a rotation speed of the internal combustion engine, a driving wheel, a clutch device which is engaged or disengaged to permit or prohibit a power transmission between the output shaft of the internal combustion engine and the driving wheel, and a vehicle speed detector which detects a vehicle speed, the restart control device comprising:
   a computer configured to:
      determine whether a performing condition is established for the vehicle to perform a coasting;
      terminate a fuel supply to the internal combustion engine and disengage the clutch device to perform a coasting of the vehicle when the computer determines that the performing condition is established;
      determine whether a restart condition for restarting the internal combustion engine is established while the vehicle is coasting;
      perform push-start by engaging the clutch device to increase a rotation speed of the internal combustion engine by a driving force generated by the coasting, and reopening the fuel supply to the internal combustion engine to start the internal combustion engine;
      perform start-up by increasing the rotation speed of the internal combustion engine using the electric motor, and reopening the fuel supply to the internal combustion engine to start the internal combustion engine; and
      try to start the internal combustion engine by one of the push-start and the start-up when the computer determines that the restart condition is established, and try to start the internal combustion engine by another one of the push-start and the start-up when the internal combustion engine has not been started,
   wherein the push-start includes:
      trying to start the internal combustion engine without any drive assistance of the electric motor when the vehicle speed detected by the vehicle speed detector is higher than a specified speed, and
      trying to start the internal combustion engine with drive assistance of the electric motor when the vehicle speed detected by the vehicle speed detector is lower than the specified speed.

2. The restart control device according to claim 1, wherein the vehicle is provided with an automatic transmission which changes a change gear ratio between the rotation speed of the internal combustion engine and a rotation speed of the driving wheel, and
the computer is configured to:
   control the change gear ratio of the automatic transmission; and
   restart the internal combustion engine by the push-start according to the vehicle speed detected by the vehicle speed detector after the computer changes the change gear ratio so that the rotation speed of the internal combustion engine exceeds a specified rotation speed.

3. The restart control device according to claim 1, wherein the computer is further configured to:
   compulsorily restart the internal combustion engine by the start-up when the vehicle speed becomes lower than a threshold at which push-start can be performed while the vehicle is coasting.

4. A restart control device applied to a vehicle which is provided with an internal combustion engine, an electric motor which is connected to an output shaft of the internal combustion engine so that a torque is applied to the output shaft to increase a rotation speed of the internal combustion engine, a driving wheel, a clutch device which is engaged or disengaged to permit or prohibit a power transmission between the output shaft of the internal combustion engine and the driving wheel, and a vehicle speed detector which detects a vehicle speed, the restart control device comprising:
   a computer configured to:
      determine whether a performing condition is established for the vehicle to perform a coasting;
      terminate a fuel supply to the internal combustion engine and disengage the clutch device to perform a coasting of the vehicle when the computer determines that the performing condition is established;
      determine whether a restart condition for restarting the internal combustion engine is established while the vehicle is coasting;
      perform push-start by engaging the clutch device to increase a rotation speed of the internal combustion engine by a driving force generated by the coasting, and reopening the fuel supply to the internal combustion engine to start the internal combustion engine;
      perform start-up by increasing the rotation speed of the internal combustion engine using the electric motor, and reopening the fuel supply to the internal combustion engine to start the internal combustion engine; and when the computer determines that the restart condition is established:
  try to start the internal combustion engine by the start-up first; and
  when the start-up fails in starting the internal combustion engine, start the internal combustion engine by the push-start,
wherein the push-start includes:
  trying to start the internal combustion engine without any drive assistance of the electric motor when the vehicle speed detected by the vehicle speed detector is higher than a specified speed, and
  trying to start the internal combustion engine with drive assistance of the electric motor when the vehicle speed detected by the vehicle speed detector is lower than the specified speed.

5. A restart control device applied to a vehicle which is provided with an internal combustion engine, an electric motor which is connected to an output shaft of the internal combustion engine so that a torque is applied to the output shaft to increase a rotation speed of the internal combustion engine, a driving wheel, a clutch device which is engaged or disengaged to permit or prohibit a power transmission between the output shaft of the internal combustion engine and the driving wheel, and a vehicle speed detector which detects a vehicle speed, the restart control device comprising:
  a computer configured to:
    determine whether a performing condition is established for the vehicle to perform a coasting;
    terminate a fuel supply to the internal combustion engine and disengage the clutch device to perform a coasting of the vehicle when the computer determines that the performing condition is established;
    determine whether a restart condition for restarting the internal combustion engine is established while the vehicle is coasting;
    perform push-start by engaging the clutch device to increase a rotation speed of the internal combustion engine by a driving force generated by the coasting, and reopening the fuel supply to the internal combustion engine to start the internal combustion engine;
    perform start-up by increasing the rotation speed of the internal combustion engine using the electric motor, and reopening the fuel supply to the internal combustion engine to start the internal combustion engine; and
    when the computer determines that the restart condition is established:
      try to start the internal combustion engine by the push-start first, and
      when the push-start fails in starting the internal combustion engine, start the internal combustion engine by the start-up,
wherein the push-start includes:
  trying to start the internal combustion engine without any drive assistance of the electric motor when the vehicle speed detected by the vehicle speed detector is higher than a specified speed, and
  trying to start the internal combustion engine with drive assistance of the electric motor when the vehicle speed detected by the vehicle speed detector is lower than the specified speed.

* * * * *